United States Patent

Green et al.

[11] Patent Number: 5,451,614
[45] Date of Patent: Sep. 19, 1995

[54] DIMENSIONALLY STABLE CLOSED CELL RIGID POLYISOCYANATE BASED FOAM PREPARED FROM A FROTH FOAMING MIXTURE

[75] Inventors: Todd J. Green, Canton; John R. Tucker, Wyandotte, both of Mich.

[73] Assignee: BASF Corporation, Mt. Olive, N.J.

[21] Appl. No.: 419,202

[22] Filed: Apr. 10, 1995

Related U.S. Application Data

[62] Division of Ser. No. 272,401, Jul. 8, 1994.

[51] Int. Cl.$^6$ .............................................. C08G 18/06
[52] U.S. Cl. ................... 521/129; 521/131; 521/172; 521/173; 521/174
[58] Field of Search ................ 521/172, 174, 131, 123

[56] References Cited

U.S. PATENT DOCUMENTS

| | | |
|---|---|---|
| 3,541,023 | 11/1970 | Cole . |
| 3,769,232 | 10/1973 | Houldridge . |
| 4,997,706 | 3/1991 | Smith et al. . |
| 5,100,922 | 3/1992 | Wada et al. . |

*Primary Examiner*—Morton Foelak
*Attorney, Agent, or Firm*—Dennis V. Carmen

[57] ABSTRACT

There is now provided a closed cell rigid polyisocyanate based foam blowing with a $C_1$-$C_4$ hydrofluorocarbon and water as blowing agents, which possesses a uniform density gradient varying by not more than 10 percent. There is also now provided a froth foaming mixture having good flow by employing a hydroxy terminated polyol which is pH neutral and a tertiary amine ether blow catalyst in an amount of 0.5 weight percent or more, using water and a $C_1$-$C_4$ hydrofluorocarbon having a boiling point of 300 K or less as co-blowing agents.

There is also provided a polyol composition having an average OH number of less than 400 and an average functionality of greater than 4, which when reacted with the isocyanate in the presence of a $C_1$-$C_4$ hydrofluorocarbon, yields a rigid closed cell polyisocyanate based dimensionally stable foam.

The formulation according to an especially preferred embodiment of the invention simultaneously satisfies the following requirements:

1) a formulated polyol composition having a viscosity of 550 cP or less;
2) the isocyanate stream and the formulated polyol stream dispensable at a 0.9:1 to 1.3:1 weight ratio, respectively;
3) frothing when dispensed from a static mixer;
4) produces a frothing foaming mixture having excellent flow characteristics as demonstrated by a substantially uniform density gradient;
5) and produces a dimensionally stable closed cell foam having a low overall density of 2.5 pcf or less.

10 Claims, No Drawings

DIMENSIONALLY STABLE CLOSED CELL RIGID POLYISOCYANATE BASED FOAM PREPARED FROM A FROTH FOAMING MIXTURE

This is a division of application Ser. No. 08/272,401 filed Jul. 8, 1994.

FIELD OF THE INVENTION

The present invention pertains to dimensionally stable closed cell rigid polyisocyanate based foams, and more particularly to foaming reaction mixtures which froth at a dispensing head and which have excellent flow characteristics, employing as a blowing agent a combination of a hydrofluorocarbon and water along with a tertiary amine ether blow catalyst in mounts of 0.5 weight percent or greater.

BACKGROUND OF THE INVENTION

Various hydrofluorocarbons have been investigated in the industry as blowing agents for polyisocyanate based foams due to their low or nonexistent ozone depletion potentials. U.S. Pat. No. 4,997,706 discloses the use of closed cell rigid polyurethane foams blown with a $C_1$–$C_4$ hydrofluorocarbon along with a blowing agent precursor such as water in amounts effective to lower the thermal conductivity of the foam relative to a similar foam made in the absence of the hydrofluorocarbon. Such rigid thermal insulation foams are generally poured or sprayed into a cavity or mold to make residential or commercial refrigeration cabinets, doors, or other applications where insulation is advantageous. The cavities into which the foaming mixture is poured or sprayed are often large and/or contain complex shapes which make it difficult for the foaming mixture to uniformly penetrate. In the case of a large cavity, the foam front begins to gel making it increasingly difficult for the mixture to cover the whole cavity and foam to a uniform density. The advantageous thermal insulation properties of the foam are defeated if gaps are left in the cavity where the foaming mixture could not penetrate, if bubbles form as a result of the foam shrinking due to poor dimensional stability, or if the density gradient is non-uniform which in turn leads to gaps or poor dimensional stability.

The flow characteristics of a foaming mixture becomes particularly critical when one employs a blowing agent which instantly volatilizes at atmospheric pressure and temperature, causing the foam to froth at the dispensing head. An example of such a blowing agent is 1,1,1,2-tetrafluoroethane (R-134a). A frothed foam has the consistency much like a shaving cream, which renders it difficult to evenly flow throughout a cavity.

When manufacturing a rigid closed cell polyisocyanate based foam in a cavity or pour in place application, the average hydroxyl number of the polyols are generally over 400 to increase the crosslinking density, provide structural strength, and prevent foam shrinkage. The higher the average hydroxyl number, however, the more isocyanate one must consume at an equivalent isocyanate index and teh faster the ingredients react. It would be desirable to increase the formulation latitude and processing window by decreasing the average hydroxyl number of the polyols, with the attendant advantage of reducing the amount of isocyanate consume and slowing the reaction down to afford improved flow characteristics. Adding high levels of blow catalyst in an effort to improve flow actually impedes the flow and impairs foam properties because the high levels of catalyst too rapidly promote the formation of urethane foam matrix. Merely lowering the average hydroxyl number, however, typically results in sacrificing dimensional stability.

SUMMARY OF THE INVENTION

It is an object of the invention to provide a rigid closed cell polyisocyanate based foam blown with a $C_1$–$C_4$ hydrofluorocarbon and water which has a substantially uniform density gradient. A foam with a good density gradient indicates that the frothed foaming mixture flowed well.

It is also an object of the invention to reduce the amount of isocyanate needed to react with a polyol composition to produce a froth foaming mixture, which when allowed to cure, produced a dimensionally stable closed cell rigid polyiscyanate based foam.

A further object of the invention is to provide a formulated polyol composition containing a $C_1$–$C_4$ hydrofluorocarbon and water as blowing agents at low viscosities suitable for dispensing from a head through a static mixer using an inert gas as a propellant.

It is also an object of the invention to provide a polyol composition with a low average hydroxyl number which yields a froth foaming mixture which flows well and a foam with good dimensional stability.

There is now provided a closed cell rigid polyisocyanate based foam blowing with a $C_1$–$C_4$ hydrofluorocarbon and water as blowing agents, which possesses a uniform density gradient varying by not more than 10 percent. There is also now provided a froth foaming mixture having good flow by employing a hydroxy terminated polyol which is pH neutral and a tertiary amine ether blow catalyst in an amount of 0.5 weight percent or more, using water and a $C_1$–$C_4$ hydrofluorocarbon having a boiling point of 300 K or less as co-blowing agents.

There is also provided a polyol composition having an average OH number of less than 400 and an average functionality of greater than 4, which when reacted with the isocyanate in the presence of a $C_1$–$C_4$ hydrofluorocarbon, yields a rigid closed cell polyisocyanate based dimensionally stable foam.

The formulation according to an especially preferred embodiment of the invention simultaneously satisfies the following requirements:

1) a formulated polyol composition having a viscosity of 550 cP or less;
2) the isocyanate stream and the formulated polyol stream dispensable at a 0.9:1 to 1.3:1 weight ratio, respectively;
3) frothing when dispensed from a static mixer;
4) produces a frothing foaming mixture having excellent flow characteristics as demonstrated by a substantially uniform density gradient;
5) and produces a dimensionally stable closed cell foam having a low overall density of 2.5 pcf or less.

DETAILED DESCRIPTION OF THE INVENTION

As used herein, the following terms of an are to be understood according to the accompanying definitions:

A "uniform density gradient" means that the overall density of the foam does not vary by more than 10 percent from the core density taken from the same foam. The percentage variation is measured according to the following formula:

$$\frac{O.D. - C.D.}{O.D.} \times 100$$

where O.D. is the overall density and C.D. is the core density The panel is packed to 10 percent beyond the theoretical value needed to completely fill the mold volume, and the free rise density of the foaming mixture employed is 1.9 pcf or less. The test is run by using a foam panel measured and taken from a 2'×4'2" mold from which the overall density is measured, and a core sample measuring 3"×3"1" taken from any point along the length of the panel and at about the center of its width. Test panels which do not have the above measurements across the entire respective surfaces are not used for determining the density gradient and would in any case indicate extremely poor flow characteristics. At no point should the density gradient anywhere on the foam panel vary by more than 10 percent.

A "polyol composition" contains at least water as a blowing agent and a compound having at least two isocyanate reactive hydrogens with a number average molecular weight of greater than 400.

A "compound having at least two isocyanate active hydrogens" has a number average molecular weight of greater than 400.

A "formulated polyol composition" is a polyol composition to which is added the $C_1$-$C_4$ hydrofluorocarbon and is a liquid at 78° F.

A "froth foaming mixture" is a combination of a formulated polyol stream and an organic polyisocyanate stream where the $C_1$-$C_4$ hydrofluorocarbon sufficiently and spontaneously vaporizes when the two combined streams are exposed to atmospheric pressure upon discharge from the dispensing head to produce a froth. It is to be understood that not all of the $C_1$-$C_4$ hydrofluorocarbon needs to vaporize instantaneously from the two stream mixture when discharged, but at least an amount sufficient to produce a froth upon discharge and prior to entry into the cavity or onto the substrate.

Turning to the polyol composition, there is provided a tertiary amine ether blow catalyst, a compound having at least two isocyanate active hydrogens, and water as a co-blowing agent. The tertiary amine ether blowing catalyst is present in an amount of 0.5 weight percent or more, preferably 0.6 weight percent or more, based on the weight of the polyol composition. The relatively large quantity of blowing catalyst advantageously improves the flow of the froth foaming mixture and enlarges the processing window. Typical tertiary amine ether blow catalysts include, but are not limited to, those within the following general formula:

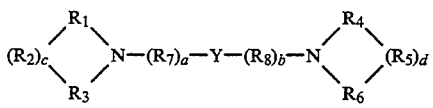

wherein $R_1$, $R_3$, $R_4$, and $R_6$ are each independently branched or preferably unbranched $C_1$-$C_5$ alkyl radicals when the corresponding c or d equals zero, preferably methyl or ethyl radicals, and $R_1$, $R_3$, $R_4$, and $R_6$ are each independently a methylene group when the corresponding c or d is greater than zero; $R_2$ and $R_5$ are branched or preferably unbranched methylene groups, optimally containing an ether $R_7$ and $R_8$ are each independently branched or unbranched methylene groups; Y is oxygen; $R_9$ and $R_{10}$ are each independently a $C_1$-$C_5$ radical; preferably a methyl or an ethyl radical; a and b are each independently an integer from 1 to 6, preferably 1 to 2; c and d are each independently an integer from 0 to 6, preferably 0; e is an integer from 2 to 4; and f is an integer from 1 to 3.

Specific examples include one or more of N,N,N',N"-tetramethyl-2,2'-diaminodiethyl ether; 2-dimethyaminoethyl-1,3-dimethylaminopropyl ether; and N,N-dimorpholinoethyl ether. Most preferred is N,N,N',N'-tetramethyl-2,2'-diaminoethyl ether.

The blow catalyst can be used in its pure form or dissolved in a carrier such as a glycol. When a catalyst is employed which is dissolved in a carrier, the amounts stated herein by weight percent refer to the amount of catalyst and do not include the weight of the carrier.

The compounds having at least two isocyanate active hydrogens have an average hydroxyl number ranging from 150 to 800 mgKOH/g of compound having at least two isocyanate active hydrogens. In a preferred embodiment, however, the average hydroxyl number is less than 400 and the average functionality is greater than 4.0., and more preferably, the average hydroxyl number is 350 or less and the average functionality is 4.5 or more. These average hydroxyl numbers are unusual in that the typical rigid polyurethane foam is made with polyols whose average hydroxyl number exceeds 400 so as to provide the rigidity and structural strength necessary to make a dimensionally stable foam. However, in the present invention, a dimensionally stable foam is provided with a polyol combination that has a low average hydroxyl number. Further, by providing a low average hydroxyl number, the flow characteristics of the froth foaming mixture are enhanced, and less isocyanate is consumed at any given isocyanate index. It is to be understood that compounds having at least two isocyanate active hydrogens whose hydroxyl numbers exceed 400 can be employed so long as the average hydroxyl number of all such compounds is less than 400.

The compounds having at least two isocyanate active hydrogens in the polyol composition also advantageously have a hydroxyl terminated polyol having a pH within the range of 6-8, deemed herein to be a pH neutral polyol. When polyols are used which do not contain a pH neutral polyol, the amount of tertiary amine ether blow catalyst must be kept low because at higher levels, the catalytic activity of, for example, basic polyols initiated with an aromatic or aliphatic amine in combination with the high levels of amine catalyst sufficiently increase the foam exotherm that the flow characteristics of the froth are impaired. Using a pH neutral polyol enables one to increase the amount of tertiary amine ether blow catalyst which in turn improve the flow characteristics of the froth.

Examples of compounds having at least two isocyanate active hydrogens include polythioether polyols, polyester amides and polyacetals containing hydroxyl groups, aliphatic polycarbonates containing hydroxyl groups, amine terminated polyoxyalkylene polyethers, and preferably, polyester polyols, polyoxyalkylene polyether polyols, and graft dispersion polyols. In addition, mixtures of at least two of the aforesaid polyols can be used as long as the combination has an average hydroxyl number in the aforesaid range.

The term "polyester polyol" as used in this specification and claims includes any minor amounts of unreacted polyol remaining after the preparation of the polyester polyol and/or unesterified polyol (e.g., glycol) added after the preparation of the polyester polyol. The polyester polyol can include up to about 40 weight percent free glycol.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di- esters of alcohols with 1 to 4 carbons, or dicarboxylic acid anhydrides. Dicarboxylic acid mixtures of succinic acid, glutaric acid and adipic acid in quantity ratios of 20-35:-35-50:20-32 pans by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., ε-caprolactone or hydroxycarboxylic acids, e.g., ω-hydroxycaproic acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multivalent alcohols are preferably polycondensed in a mole ratio of 1:1-1.8, more preferably 1:1.05-1.2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene terephthalate, and the like.

Other residues are DMT process residues, which are waste or scrap residues from the manufacture of dimethyl terephthalate (DMT). The term "DMT process residue" refers to the purged residue which is obtained during the manufacture of DMT in which p-xylene is convened through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

Polyoxyalkylene polyether polyols, which can be obtained by known methods, are particularly preferred for use as the compounds having at least two isocyanate active hydrogens. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydfins such as epichlorohydrin; as well as aralkylene oxides such as styrene oxide. The polyalkylene polyether polyols may have either primary or secondary hydroxyl groups, preferably secondary hydroxyl groups from the addition of propylene oxide onto an initiator because these groups are slower to react.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Particularly preferred in the polyol composition is at least one polyol which is initiated with a polyhydric alcohol having 4 or more hydroxyl groups, such as sucrose, or a mixture of initiators employing a polyhydric alcohol having at least 4 hydroxyl groups. In particular, it is preferred that the pH neutral polyol be made with an initiator or mixture of initiators employing a polyhydric alcohol having 4 or more hydroxyl groups such as sucrose, or a sucrose/glycerine mixture.

Suitable organic amine initiators which may be condensed with alkylene oxides include aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable as the polyol are polymer modified polyols, in particular, the so-called graft polyols. Graft polyols are well known to the an and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. Nos. 4,690,956; and in 4,524,157; all of which patents are herein incorporated by reference.

Non-graft polymer modified polyols are also useful, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

The closed cell rigid polyisocyanate based foam of the invention is blown with at least two blowing agents: water and a $C_1$–$C_4$ hydrofluorocarbon having a boiling point of 300 K or less. The blowing agents which can be used may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. In the present invention, water is at least one of the chemically active blowing agents used. Water reacts with the organic isocyanate to liberate $CO_2$ gas which is the actual blowing agent. However, since water consumes isocyanate groups, an equivalent molar excess of isocyanate must be used to make up for the consumed isocyanates. Other suitable chemically active blowing agents include, but are not limited to, water, mono- and polycarboxylic acids having a molecular weight of from 46 to 300, salts of these acids, and tertiary alcohols.

If organic carboxylic acids are additionally used, suitable examples would include aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids could contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichlorpropionic acid, hexanoic acid, 2-ethyl-hexanoic acid, cyclohexanecarboxylic acid, dodecanoic acid, palmitic acid, stearic acid, oleic acid, 3-mercapto-propionic acid, glycoli acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and acid contained in the polyol composition.

Combinations of any of the aforementioned chemically active blowing agents may be employed, such as formic acid, or salts of formic acid, and at least water.

Physically active blowing agents are those which boil at the exotherm foaming temperature or less, preferably at 50° C. or less. The most preferred physically active blowing agents are those which have an ozone depletion potential of 0.05 or less. Examples of physically active blowing agents are the volatile non-halogenated hydrocarbons having two to seven carbon atoms such as alkanes, alkenes, cycloalkanes having up to 6 carbon atoms, dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products.

Examples of volatile non-halogenated hydrocarbons include linear or branched alkanes, e.g. butane, isobutane, 2,3 dimethylbutane, n- and isopentane and technical-grade pentane mixtures, n- and isohexanes, n- and isoheptanes, n- and isooctanes, n- and isononanes, n-and isodecanes, n- and isoundecanes, and n- and isododecanes. Since very good results are achieved with respect to the stability of emulsions, the processing properties of the reaction mixture and the mechanical properties of polyurethane foam products produced when n-pentane, isopentane or n-hexane, or a mixture thereof is used, these alkanes are preferably employed. Furthermore, specific examples of alkenes are 1-pentene, 2-methylbutene, 3-methylbutene, and 1-hexene, of cycloalkanes are cyclobutane, preferably cyclopentane, cyclohexane or mixtures thereof, specific examples of linear or cyclic ethers are dimethyl ether, diethyl ether, methyl ethyl ether, vinyl methyl ether, vinyl ethyl ether, divinyl ether, tetrahydrofuran and furan, and specific examples of ketones are acetone, methyl ethyl ketone and cyclopentanone. Preferentially, cyclopentane, n- and isopentane, n-hexane, and mixtures thereof are employed.

Hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-dichloro-1,2,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and transchlorofluoroethylene (HCFC-1131). The most preferred hydrochlorofluorocarbon blowing agent is 1,1-dichloro-1-fluoroethane (HCFC-141b).

Perfluorocarbons or fluorinated ethers include hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane, -heptane, and -octane; perfluorodiethyl ether; perfluorodipropyl ether; and perfluoroethyl propyl ether.

As a physically active blowing agent, at least a $C_1$–$C_4$ hydrofluorocarbon blowing agent having a boiling point of 300 K or less, preferably 273 K or less, is employed.

Suitable hydrofluorocarbons include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142), trifluoromethane; heptafluoropropane (R-227a); hexafluoropropane (R-136); 1,1,1-trifluoroethane; 1,1,2-trifluoroethane; fluoroethane (R-161); 1,1,1,2,2-pentafluoropropane; pentafluoropropylene (R-2125a); 1,1,1,3-tetrafluoropropane; tetrafluoropropylene (R-2134a); difluoropropylene (R-2152b); 1,1,2,3,3-pentafluoropropane; and 1,1,1,3,3-pentafluoro-n-butane.

In a preferred embodiment, the physically active blowing agent is at least 1,1,1,2-tetrafluoroethane (R-134a), and more preferably R-134a is the sole physically active blowing agent used because of its wide availability, its zero ozone-depletion potential, and its excellent frothing characteristics.

Physically active blowing agents contemplated as suitable additives in the polyol composition comprise alkanes having 4 to 12 carbon atoms, preferable 5 or 6 carbon atoms, such as n-pentane, isopentane, or n-hexane; cycloalkanes having 4 to 6 carbon atoms preferable 5 or 6 carbon atoms, such as cyclopentane; linear or cyclic, saturate or olefinically unsaturated ethers having 2 to 5 carbon atoms, such as dimethylether, diethylether, methylethylether, vinyl methyl or ethyl ether, divinyl ether, and THF; aliphatic carboxylic acid esters having a maximum boiling point of 142° C., preferably below 80° C., such as 1–4 carbon acetates and methyl or ethyl formate; aliphatic and/or cycloaliphatic ketones having 3 to 5 carbon atoms, such as acetone, methyl ethyl ketone, and cyclopentane; partially halogenated chlorofluorocarbons having 1 or 2 carbon atoms, such as R22, R123, R-141b; perfluorinated, linear or cyclic ethers having 4 to 12 carbon atoms, preferably 4 to 6 carbon atoms, such as perfluorodineopyl or ether or perfluoroethyl propyl ether; and preferably fluorinated or perfluorinated, advantageously aliphatic or cycloaliphatic hydrocarbons having 3 to 8 carbon atoms, preference being given to aliphatic or cycloaliphatic, fluorinated hydrocarbons having 3 to 6 carbon atoms which are liquid at room temperature and contain at least one bonded hydrogen atom and aliphatic or cycloaliphatic, perfluorinated hydrocarbons having 4 to 7 carbon atoms.

R-134a has a boiling point of 247 K ($-26°$ C. at 760 mm/Hg) and readily vaporizes at atmospheric pressure to froth a foaming mixture as it exits a dispensing head. R-134a may be added to the polyol composition at the dispensing head as a separate stream; blended into the polyol composition tank immediately prior to dispensing; or it may be pre-blended into the polyol composition, stored, and shipped in pressurized containers to a manufacture of the foams of the invention. To make a formulated polyol composition by any of these methods, R-134a is liquified under pressure, metered to the polyol composition, and optionally but preferably blended until a homogenous solution is formed. Tanks containing the formulated polyol composition are pressurized at 200–300 psig, and depending on the type of dispensing method employed as discussed further below, may also be pre-added with an inert gas such as nitrogen.

The amount of R-134a employed will depend upon the desired density and the limits of its solubility in a particular polyol composition. To reduce costs, it is always advantageous to keep the amount of R-134a to a minimum within the desired density range. The proportion of water and R-134a is also impacted by these two considerations. Increasing the amount of water in the polyol composition will generate a higher exothermic temperature which leads to greater reactivity and a resultant decrease in the flow of the froth across a substrate or in a cavity.

In a formulated polyol composition of the invention, amounts of water are generally used are from 1.5 weight percent to 4.0 weight percent, with 2.5 to 3.5 weight percent being an optimal range, based on the weight of the polyol composition, or from 0.7 to 2.0 weight percent, preferably 1.2 to 1.75 weight percent of water, based on the weight of the froth foaming composition. Amounts of R-134a added to the polyol composition range are from 7 to 13 pbw, and to fully take advantage of the features of this invention, from 8–11 pbw, based on 100 pbw of the polyol composition, and 3.0 to 6.5 weight percent, preferably from 4 to 6 weight percent, based on the weight of the froth foaming composition which includes the isocyanate and polyol composition. At amounts of less than 3.0 weight percent, such as about 2 weight percent based on the weight of the froth foaming composition, the foaming mixture does not froth. Therefore, to form a froth, at least 3.0 weight percent of R-134a should be used, based on the weight of the foaming composition. At these amounts of R-134a and water, we have been able to produce rigid closed cell polyisocyanate based foams having low free rise densities ranging from 1.5 pcf to 1.9 pcf and low overall molded densities ranging from 2.0 pcf to 2.5 pcf, more preferably from 2.1 pcf to 2.3 pcf.

Other catalysts, besides the tertiary amine ether blow catalyst, which greatly accelerate the reaction of the compounds containing hydroxyl groups and with the modified or unmodified polyisocyanates may be used. Examples of suitable other catalysts are organometallic compounds, preferably organotin compounds, such as tin(II) salts of organic carboxylic acids, for example, tin(II) acetate, tin(II) octanoate, tin(II) ethylhexanoate and tin(II) laurate, and the dialkyltin(IV) salts of organic carboxylic acids, for example, dibutyltin diacetate, dibutyltin dilaurate, dibutyltin maleate and dioctyltin diacetate, and tertiary amines, for example, triethylamine, 3-methoxypropyldimethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

The polyol composition also preferably contains a flame retardant. Examples of suitable phosphate flameproofing agents are tricresyl phosphate, tris(2-chloroethyl) phosphate, tris(2-chloropropyl) phosphate, and tris(2,3-dibromopropyl) phosphate. In addition to these halogen-substituted phosphates, it is also possible to use inorganic or organic flameproofing agents, such as red phosphorus, aluminum oxide hydrate, antimony trioxide, arsenic oxide, ammonium polyphosphate (Exolit ®) and calcium sulfate, molybdenum trioxide, ammonium molybdate, ammonium phosphate, pentabromodiphenyloxide,2,3-dibromopropanol,hexabromocyclododecane,dibromoethyldibromocyclohexane, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 40 weight percent, preferably from 5 to 20 weight percent, of said flameproofing agents may be used based on teh weight of the polyol composition.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl- 1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652. The organic di- and polyisocyanates can be used individually or in the form of mixtures. The preferred isocyanate is polymeric MDI.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

While the isocyanate compound stream may be mixed with a formulated polyol composition stream at a wide range of weight ratios, an advantageous feature of the formulated polyol composition allows one to mix the two streams at a weight ratio of from 0.9:1 to 13:1 respectively, preferably at a 1:05 to 1.15:1 weight ratio, and at an isocyanate index ranging from 100 to 130, preferably at 105 to 120, while obtaining a foam having excellent dimensional stability at the low densities mentioned above. Prior polyurethane foam formulations, however, were reacted at an iso/polyol weight ratio of from about 1.5:1 to 2:1 at isocyanate indices of 100 to 130, which required a larger amount of isocyanate to stoichiometrically react with the isocyanate reactive groups at equivalent isocyanate indices. Thus, the formulation of the invention and the method of dispensing allows one to manufacture a dimensionally stable foam using much smaller quantities of isocyanate.

In another feature of the invention, the froth foaming mixture can be dispensed at a constant flow regardless of pressure changes at the outlet of the dispensing head, thus obviating the need for using positive displacement flow control units or for metering the iso stream and polyol stream into the dispensing head at different flow rates. In this embodiment, the froth foaming mixture can be dispensed from a portable foaming apparatus as disclosed in U.S. Pat. Nos. 3,541,023 and 3,769,232, each of which is incorporated herein by reference. While the use of a static mixing device as the dispensing head is particularly preferred, the polyol composition along with the $C_1$–$C_4$ hydrofluorocarbon frothing agent can be employed in low pressure equipment having rotary mechanical mix dispensing heads or on high pressure equipment using impingement mix dispensing heads.

Typically, the portable foaming apparatus is comprised of at least two reactants supply tanks, a static mixer having inlets in communication with the supply tanks and an outlet for expelling the mixed reactants, means for imposing gas pressure to drive the reactants from the supply tanks, through and out of the static mixer, and flow control units for delivering the desired ratio of reactants, from their respective tanks, to the static mixer.

One of the supply tanks contains the organic isocyanate reactant or an organic isocyanate-terminated quasi-prepolymer or prepolymer. If desired, this tank may also contain an additive amount of a non-reactive fire-retardant material which may be used to impart flame retardant properties to the resulting foam. This tank may also contain R-134a and other non-reactive blowing agents in liquid form, but it is preferred to add all of the R-134a and other blowing agents to the formulated polyol composition supply tanks. The other polyurethane foam forming reactants may be supplied from one or more additional polyol composition supply tanks. Usually a single second tank is used to supply all these other reactants, i.e., polyol, foaming agent, catalyst, and surfactant, if such is used.

Any means for imposing pressure to drive the reactants from the supply tanks through and out of the static mixer may be used. Typically, a pressurized gaseous inert propellant, such as a nitrogen tank, is used having valved outlets communicating via suitable conduits with the inlets to the supply tanks. The supply tanks are kept under pressure to provide the driving force needed to propel the reactants from the supply tanks and to liquify the R-134a blowing agent in the formulated polyol compositions supply tank(s). The pressure in the supply tanks is generally 200–250 psig.

It is generally necessary, for the proper functioning of the portable foaming apparatus, that the viscosity of the contents of each of the supply tanks be no greater than about 1000 cps at 78° F. and more preferably no more than about 800 cps. This, of course, means that the materials in each tanks may have to be properly selected or formulated, as the case may be, in order to meet this viscosity requirement. The formulated polyol composition according to the invention advantageously has a very low viscosity of 550 cps or less, even lower than 400 cps, rendering the formulation eminently suitable for use in the portable foaming apparatus. The viscosity values mentioned herein are measured at 78° F. and at 80 psig. The viscosity of supply tanks contents are measured under a pressure of 80 psig because of the presence of R-134a in liquid form.

The portable foaming apparatus comprises a static mixer which is one containing no moving parts. Any such mixer which serves to adequately blend the reactants may be used. Illustrative of such a mixer is the one disclosed in U.S. Pat. No. 3,286,992.

By employing a portable foaming apparatus, the volume ratio of the isocyanate stream to the formulated polyol composition stream can be held at 1:1±0.1, or as pointed out above, at weight ratio in a preferable range of 1:05 to 1.15:1, thereby reducing the amount of isocyanate required to make a foam at a desired isocyanate index.

The isocyanate stream and the polyol composition stream are propelled by the inert gas under pressure into a dispensing head to form a foamable mixture which is ejected from the dispensing head through a static mixer dispensing head as a froth foaming mixture, which is a partially expanded foaming mixture much akin to the consistency of shaving cream, but which continues to expand on or in the application site to its full molded or free rise volume. The foamable mixture contains the liquid $C_1-C_4$ hydrofluorocarbon frothing agent having a boiling point of 300 K or less, and preferably a formulated polyol composition is employed so that only two liquid streams enter the dispensing head. Although the foamable mixture exiting the dispensing head, preferably through a static mixer, is in the form of a froth, the froth foaming mixture according to the invention has excellent flow characteristics as demonstrated by the uniform density gradient of the resulting polyisocyanate based rigid closed cell foam.

In a more preferred embodiment, the foams made with the formulated polyol composition have a uniform density gradient which varies by not more than 8 percent, most preferably by not more than 6 percent. The high amount of blow catalyst, the low levels of water as a co-blowing agent, the low viscosity of the formulated polyol composition, and the low average hydroxyl number of the polyols all have a combined effect of producing a froth foaming mixture which flows well and produces a low density foam having excellent dimensional stability.

The polyurethane foams made according to the invention are dimensionally stable, meaning that the percent volume change of a 3"×3"×1" core sample tested according to ASTM D 2126-87 taken from a 10 percent overpacked mold measuring 2'×4'×2" is less than ±5 percent, at 20° F., 158° F., 200° F., 100° F. and 100 percent relative humidity, and 158° F. and 100 percent relative humidity. Preferably, the percent volume change is less than ±4 percent, and more preferably ±3 percent or less.

The polyisocyanate based foams of the invention have a closed cell content of at least 85 percent, preferably 90 percent or more, and most preferably 95 percent or greater. The foams of the invention also are rigid, meaning that they have a high ratio of compressive strength to tensile strength of 0.5:1 or greater and an elongation of 10 percent or less.

Polyurethane foams prepared by the process of the invention have utility in a variety of applications in which the foam is generated on-site from a portable foaming apparatus. This includes the production of foam-core structural and architectural panels and partitions, building and vehicular insulation, marine flotation devices, water heater insulation, refrigeration cabinets and panels, picnic coolers, and a variety of molded objects for use in home furnishing.

The following examples are intended to illustrate, but in no way limit, the scope of the present invention. The following examples are provided to illustrate the invention. The foaming apparatus used in these examples was identical to the apparatus disclosed in U.S. Pat. No. 3,769,232 except that it did not include the valved timing assembly embodied in the apparatus of that patent. Thus, the apparatus comprised (a) a first supply tank for supplying the isocyanate reactant, (b) a second supply tank for supplying the other foam forming ingredients, (c) a nitrogen pressure tank having a valved outlet in communication, via a distributing valve, with the inlets to the two supply tanks, (d) a static mixer having one outlet and two inlets communicating with the supply tanks outlets, and (e) adjustable flow control units interposed in the conduits linking the supply tank with the static mixer.

The polyols employed in the working examples are defined as follows:

| | |
|---|---|
| Polyol A | is a propylene oxide adduct of a sucrose/glycerine mixture having a pH of 6.5 and a nominal hydroxyl number of 360. |
| Polyol B | is a propylene oxide adduct of sucrose having a nominal hydroxyl number of 370 and a pH of 11.5. |
| Polyol C | is a glycerine initiated propylene oxide adduct having a nominal hydroxyl number of 168. |
| PCF | is Fyrol PCF, a flame retardant, available from Great Lakes Chemical. |
| Niax L5440 | is a silicone surfactant commercially available from Union Carbide. |
| DABCO BL-11 | is 70 percent N,N,N',N'-tetramethyl diamino-diethyl ether in 30 percent dipropylene glycol commercially available from Air Products. |
| DABCO 8154 | is a 2-ethyl-hexanoic acid blocked triethylene diamine, commercially available from Air Products. |
| DABCO 33-LV | is 33 percent triethylene diamine in 67 percent dipropylene glycol. |

EXAMPLE 1

The portable foaming apparatus referred to above was employed to prepare a frothed, rigid, molded polyurethane foam using the procedure and ingredients described herein.

The foam forming ingredients were supplied from two cylindrical metal tanks. One supply tank contained the Iso A reactant, namely, polymethylene polyphenylene isocyanate. This material is commercially available under the trademark AUTOFROTH ® 9300A, a product of BASF Corporation, and has a viscosity at 25° C. of 200 cps. The other supply tank, the total content of which had a viscosity of 375 cps at 77° F. for Sample 1 and 370 cps at 77° F. for sample 2, when measured at 80 psig; contained the following ingredients in Table 1 in the indicated relative proportions as weight percent.

TABLE 1

| INGREDIENTS | SAMPLE 1 | SAMPLE 2 |
|---|---|---|
| Polyol A | 40.5 | 39.5 |
| Polyol B | 19.0 | 20.0 |
| Polyol C | 19.0 | 18.0 |
| PCF | 15.6 | 15.6 |
| L5540 | 2.2 | 2.0 |
| DABCO BL-11 | 0.9 | 0.9 |
| DABCO 33-LV | — | 1.0 |
| WATER | 2.8 | 3.0 |
| TOTAL | 100 | 200 |
| R-134a | 9.0 | 9.0 |
| PERCENT IN RESIN | | |
| ISO A | 100 | 100 |
| INDEX | 113.7 | 109.4 |
| WEIGHT RATIO OF ISO/FORM. | 100/93 | 100/93 |

TABLE 1-continued

| INGREDIENTS | SAMPLE 1 | SAMPLE 2 |
| --- | --- | --- |
| POLYOL COMP. | | |

Both of the two supply tanks were placed horizontally on a drum roller and rotated continuously for two hours at an approximate rate of 35 revolutions per minute. After the rotation was stopped, the inlets to the two supply tanks were connected to the nitrogen pressure tank and the pressure was increased to 240 psig. The tanks outlets were connected to the static mixer via separate conduits provided with flow control units. With the flow control units adjusted to deliver to the static mixer equal weight proportions from the first and second supply tanks, the foam forming ingredients were expelled, by means of the nitrogen head pressure, from their respective tanks, through the static mixer, and out into an aluminum mold preheated to 90° F. and having the dimensions 2'×4'×2". The results are reported below in Table 2.

TABLE 2

| PROPERTIES | SAMPLE 1 | SAMPLE 2 |
| --- | --- | --- |
| Density, f.r., 6" Core from 2' × 2' × 2' Box | 1.7 pcf | 1.6 pcf |
| Density, f.r., #10 Lily cup | 1.75 | 1.65 pcf |
| Gel Time | 1'20" | 40" |
| Tack Free Time | 3'00" | 1'15" |
| Weight Ratio Iso/Resin | 100/93 | 100/93 |
| Test Panel 2' × 4' × 2" | | |
| Overall Density | 2.2 pcf | 2.2 pcf |
| Core Density | 2.1 pcf | 2.05 pcf |
| % Variance | 5 percent | 7 percent |
| Compressive Strength (yield) | | |
| Parallel | 26 | 26 |
| Perpendicular | 20 | 19 |
| U.L. 94 HF-1 | | |
| Average Self-Extinguish | 48 seconds | 46 seconds |
| Average Damage Length | 35 mm | 38 mm |
| % Closed cell, uncorrected | 90 | 93 |
| % Volume Change, 14 Days | | |
| −20° F. | 0.2 | +0.4 |
| 158° F. | −0.5 | −1.7 |
| 200° F. | −1.8 | −2.9 |
| 100° F. + 100% R.H. | −1.4 | −1.8 |

TABLE 2-continued

| PROPERTIES | SAMPLE 1 | SAMPLE 2 |
| --- | --- | --- |
| 158° F. + 100% R.H. | +1.0 | +3.2 |

What we claim is:

1. A rigid closed cell polyisocyanate based foam having a closed cell content of at least 85 percent, prepared from a froth foaming mixture comprising:
   a) a polyol composition comprising a hydroxyl terminated polyol having a pH in the range of 6–8, water as a co-blowing agent, and a tertiary amine ether blow catalyst in an amount of 0.5 weight percent or greater based on the weight of the polyol composition;
   b) a polymethylene polyphenylene polyisocyanate; and
   c) 1,1,1,2-tetrafluoroethane as a co-blowing agent.

2. The foam of claim 1, wherein the foam has a uniform density gradient varying by not more than 10 percent.

3. The foam of claim 2, wherein the foam has a uniform density gradient varying by not more than 6 percent.

4. The foam of claim 1, wherein the tertiary amine ether blow catalyst comprises N,N,N,N"-tetramethyl-2,2'-diaminodiethyl ether; 2-dimethyaminoethyl-1,3-dimethylaminopropyl ether; or N,N-dimorpholinoethyl ether.

5. The foam of claim 4, wherein the tertiary amine ether blowing catalyst comprises N,N,N',N',-tetramethyl-2,2'-diaminodiethyl ether.

6. The foam of claim 1, wherein the amount of blow catalyst is 0.6 weight percent or more.

7. The foam of claim 6, wherein the tertiary amine ether blowing catalyst comprises N,N,N',N',-tetramethyl-2,2'-diaminodiethyl ether.

8. The foam of claim 1, wherein the viscosity of said froth foaming mixture is 550 cP or less at 78° F. and 80 p.s.i.g.

9. The foam of claim 8, wherein the viscosity of said froth foaming mixture is 400 cP or less at 78° F. and 80 p.s.i.g.

10. The foam of claim 2, wherein the amount of tetrafluoroethane ranges from 3.0 wt. % to 6.5 wt. % based on the weight of the froth foaming mixture.

* * * * *

Dedication 5,451,614 — Todd J. Green, Canton; John R. Tucker, Wyandotte, both of Mich. DIMENSIONALLY STABLE CLOSED CELL RIGID POLYISOCYANATE BASED FOAM PREPARED FROM A FROTH FOAMING MIXTURE. Patent dated September 19, 1995. Dedication filed August 23, 2000, by the assignee, BASF Corporation.

Hereby dedicates to the public the entire term of said patent.

*(Official Gazette,* November 21, 2000)